May 20, 1958 — A. J. ALESSI, JR., ET AL — 2,835,376
ARTICLE CONVEYING APPARATUS
Filed Nov. 30, 1953 — 4 Sheets-Sheet 1

Fig. 1

INVENTOR.
ANDREW J. ALESSI JR., IRA S. GOTTSCHO
AND MALCOLM HIRSCHEY.
BY

ATTORNEY.

May 20, 1958 A. J. ALESSI, JR., ET AL 2,835,376
ARTICLE CONVEYING APPARATUS
Filed Nov. 30, 1953 4 Sheets-Sheet 3

INVENTOR.
ANDREW J. ALESSI JR., IRA S. GOTTSCHO
AND MALCOLM HIRSCHEY.
BY
ATTORNEY.

May 20, 1958  A. J. ALESSI, JR., ET AL  2,835,376
ARTICLE CONVEYING APPARATUS

Filed Nov. 30, 1953  4 Sheets-Sheet 4

INVENTORS.
ANDREW J. ALESSI JR., IRA S. GOTTSCHO,
AND MALCOLM HIRSCHEY.
BY  Joseph Montgomery
ATTORNEY.

United States Patent Office 2,835,376
Patented May 20, 1958

2,835,376

ARTICLE CONVEYING APPARATUS

Andrew J. Alessi, Jr., Colonia, and Ira S. Gottscho, Milburn, N. J., and Malcolm Hirschey, Woodside, N. Y., assignors to Adolph Gottscho, Inc., Hillside, N. J., a corporation of New York Application November 30, 1953, Serial No. 395,018

17 Claims. (Cl. 198—34)

The present invention relates generally to article conveying apparatus, and is particularly directed to apparatus for separating successive articles and for conveying the separated articles in a predetermined, spaced apart relationship past an operating station, for example, a marking station at which inked or other impressions are applied to the successive articles.

Prior to this invention, apparatus was proposed for separating successive articles and for conveying the separated articles in a predetermined, spaced apart relationship past a marking, or other operating station. Such prior apparatus included a conveyor surface having guide rails extending along the opposite sides thereof with a conveyor belt moving over the conveyor surface along a path adjacent each of the guide rails. The articles to be marked were successively fed onto the conveyor surface at one end and the conveyor belts there frictionally engaged the lower surfaces of the successive articles to carry the latter toward the other or discharge end of the conveyor surface. In order to separate the successive articles on the conveyor surface, a lift member was arranged to intermittently raise-up from below the level of the conveyor belts and thereby to lift the article thereabove out of contact with the conveyor belts so that the motion of the lifted article was arrested while the preceding article continued to move and separate from the lifted article. In order to time the discharge of the separated articles from the conveyor belts, a stop finger was coupled with the lift member to intermittently move into the path of travel of the successive separated articles so that each article was discharged from the conveyor belts only at the predetermined instant when the stop finger was withdrawn from the path of travel. Finally, the above referred to prior apparatus included a conveyor surface extending from the discharge end of the conveyor belts to receive the separated discharged articles and continuous conveyor chains moving along the last mentioned conveyor surface and having pushers or the like projecting therefrom to come up behind each of the discharged articles and to propel the latter past a marking, or other operating station, disposed adjacent the path of travel of the articles propelled by the conveyor chains.

The above described separating and conveying apparatus has been found to possess several disadvantages. If long thin articles or cartons are to be handled, and such articles are fed to the conveyor belts with the end of the article at one side preceding the end of the article at the other side, that one end of the article is picked up first by the conveyor belt at the related side of the apparatus and tends to increase the angle between the article and the direction of feed. Further, if the separating and conveying apparatus is positioned after a conventional cartoning machine to receive successive cartons from the latter, and the cartoning machine, as often happens, fails to properly seat the flaps at one side or the other of a carton, the effective transverse dimension of the carton will be increased and excessive frictional resistance to movement will be exerted by one or the other of the side guide rails to cause skewing of the carton as it is advanced by frictional contact of the conveyor belts with the lower surface of the article. Such skewing of the cartons also occurs when the above described apparatus follows a cartoning machine in which glue is applied to flaps at the sides of the cartons and the excess glue is deposited on the side guide rails of the belt conveyor portion to unevenly increase the frictional resistance to movement of the articles. Further, with the above described prior apparatus, a gap or space must be left between the adjacent ends of the conveyor surfaces associated with the conveyor belts and conveyor chains to permit the conveyor belts to pass downwardly from their upper runs to their lower or return runs and, when an elongated carton of relatively small and square cross-section is fed from the belt conveyor section to the chain conveyor section with its longitudinal axis extending laterally relative to the direction of the feeding movement, the front end of the carton often dips down into such a gap and becomes caught on the leading end of the surface of the chain conveyor section so that the carton is then rotated by the pushers about its longitudinal axis and markings applied to the laterally facing ends of the carton will not be properly related to the top of the carton. Finally, with the above described existing apparatus, it is not possible to operate the conveyors at a high speed, particularly when light weight articles or cartons are to be handled, as some time lag occurs between the withdrawal of the stop finger from the path of travel of the articles or cartons on the belt conveyor and the frictional coupling of the released article with the conveyor belts by reason of the small pressure applied by the light article on the belts. Thus, the delay in the resumption of movement of the released article often causes the pusher, which is timed to come up behind the article, to incorrectly come up intermediate the front and back ends of the article thereby damaging the article and disrupting the synchronization between the advance of the articles on the conveyor chains and the operation of the marking or other devices associated therewith.

Accordingly, it is an object of the present invention to avoid the above mentioned disadvantages of the existing apparatus, and to provide apparatus which is capable of high speed operation and effective to separate the articles fed thereto and then to feed the separated articles in predetermined, spaced apart relationship past an operating station.

Another object is to provide apparatus of the described character capable of handling cartons, articles and the like, of varying dimensions and weights while avoiding skewing or rotation of such cartons, articles and the like during movement through the apparatus.

Still another object is to provide apparatus of the described character arranged for easy adaptation to the handling of cartons, articles and the like of different dimensions, and for varying the rate of output of articles from the discharge end of the apparatus without requiring any change in the speed of movement of the chain conveyor section thereof.

Still another object is to provide apparatus of the described character associated wtih a marking assembly which is capable of producing clear and distinct impressions even when the surfaces or panels of the articles to be marked are relatively flexible.

In accordance with the present invention, the above, and other objects, features and advantages more particularly referred to in the following description of an illustrative embodiment, may be realized by providing apparatus comprising two elongated supporting members extending horizontally in parallel relationship, with at least one of the supporting members being movable laterally relative to the other to accommodate articles of varying widths. The articles to be separated and then conveyed in spaced apart relationship past a marking station are fed onto the elongated supporting members at one end of the latter and a continuous conveyor belt, carried by pulleys rotating about vertical axes, moves along the outer edge of an initial portion of each of the supporting members to frictionally engage the opposite side surfaces of the articles and thereby advance the latter along that initial portion of the supporting members. Further, the supporting members are formed with upstanding, laterally extending shoulders at locations adjacent the end of their initial portion so that an article advanced by the conveyor belts will come to rest against the upstanding shoulders and the belts will then slip relative to the side surfaces of the article at rest. The top surfaces of the supporting members extending from the upstanding shoulders are flush with the upper edges of the latter so that, when an article is lifted above the shoulders, the article can then be further advanced by the conveyor belts onto the elevated top surface portions of the supporting members. Such lifting of the article at rest against the shoulders is accomplished by lift plungers which are normally retracted below the top surfaces of the supporting members in advance of the shoulders and are intermittently raised, to elevate the front end of an article above the shoulders, and then retracted to permit the following article to come to rest against the shoulders, thus, the successive articles are separated in the direction of movement thereof. Further, the apparatus embodying this invention includes continuous conveyor chains movable in vertical planes adjacent the inside edges of the supporting members and having horizontal upper runs extending substantially from the location at which the conveyor belts lose contact with the side surfaces of an article on the support members to the discharge ends of the latter. Pushers, which are preferably even in number, extend from the conveyor chains to project above the portions of the top surfaces of said supporting members extending from the shoulders during movement of the chains along their upper runs and to there engage behind the separated articles and propel the latter past a marking station. The movement of the conveyor chains is synchronized with the operation of the lift plungers so that each pusher will come up immediately behind a separated article. A hold down assembly is vertically adjustable above the supporting members and includes resilient pressure applying means in the area of the marking station to bear downwardly on the article during marking and thereby to prevent blurring of the impression due to vertical movement of the article relative to the marking element. Similarly, resilient pressure applying means is associated with the run of each of the conveyor belts coming into initial feeding contact with the articles fed to the apparatus so that an adequate frictional pressure will be obtained to ensure proper feeding of the articles over the initial portions of the supporting members. Finally, the marking element preferably consists of a printing wheel having suitable type on its periphery and formed with a small diameter so that the area of contact is relatively small to prevent blurring of the impression, even when the printed surface is relatively flexible.

In order that the invention may be fully understood, an illustrative embodiment thereof is hereinafter described in detail, merely by way of example, and is shown in the accompanying drawings forming a part hereof and wherein.

Figure 1:
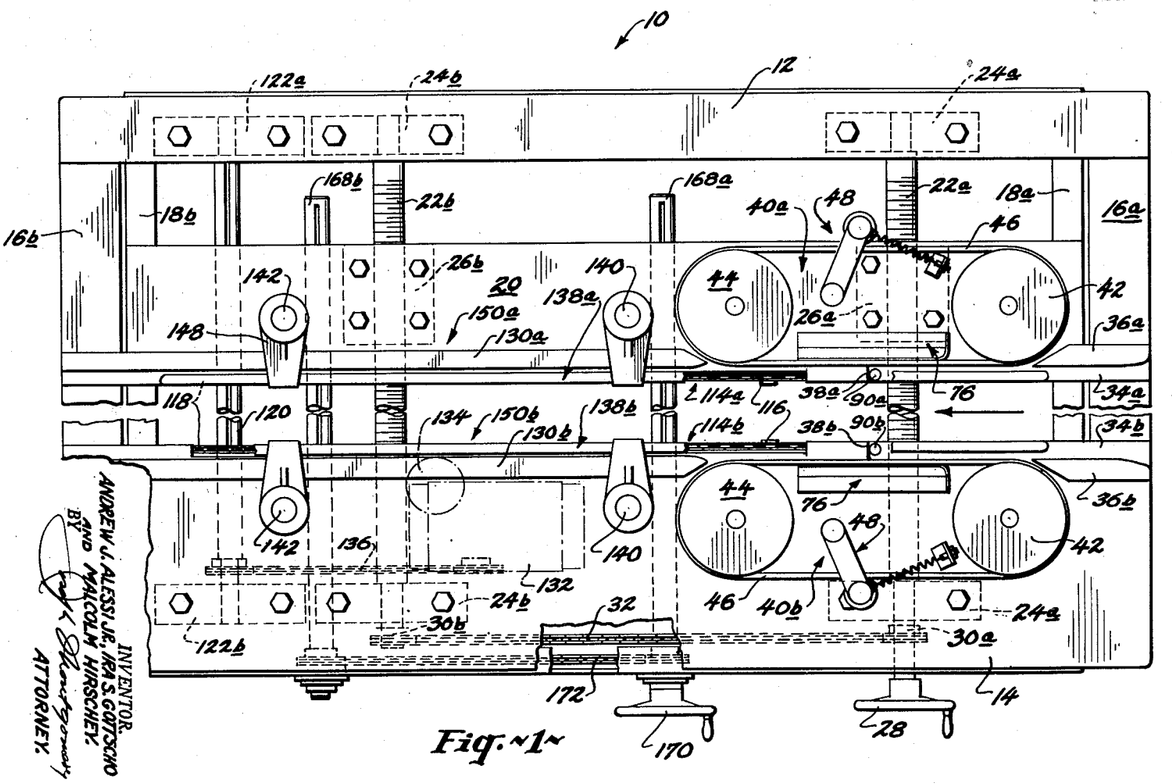
Fig. 1 is a top plan view of apparatus embodying the present invention.

Referring to the drawings in detail, and initially to Fig. 1 thereof, an article conveying apparatus embodying the present invention is there illustrated and referred to generally by the reference numeral 10. The apparatus 10 includes a preferably rectangular frame formed by a first elongated side member 12, a second elongated and rectangular side member 14, and cross members 16a and 16b extending between the front and rear ends, respectively, of the side members 12 and 14 to maintain the latter in fixed and parallel, spaced apart relationship. The frame formed by the members 12, 14, 16a and 16b is supported in a horizontal plane, at a suitable height, by a rigid sub-frame (not shown). Guide members 18a and 18b extend transversely between the side frame members 12 and 14 at locations adjacent the front and rear cross members 16a and 16b, respectively. An elongated, rectangular plate 20 extends parallel to the side frame member 14 and is movable laterally toward and away from the latter upon the guides 18a and 18b which serve to support the opposite ends of the plate 20. Front and rear screw shafts 22a and 22b extend laterally below the frame members 12 and 14 and the plate 20, and these screw shafts are rotatably journalled, adjacent their opposite ends, in suitable bearing hangers or brackets 24a and 24b which are bolted, or otherwise secured, to the underside of the frame members 12 and 14. Further, the screw shafts 22a and 22b threadably extend through tapped bores provided within members 26a and 26b, respectively, which are secured, by bolts or the like, to the underside of the plate 20. Thus, when the screw shafts 22a and 22b are rotated in unison, such rotation causes lateral movement of the plate 20 toward and away from the plate constituting the side frame member 14. In order to provide for rotation of the screw shafts 22a and 22b, an end of the shaft 22a is extended beyond the outer edge of the side frame member 14 and has a hand wheel 28 secured thereto. Sprockets 30a and 30b are fixed upon the screw shafts 22a and 22b, and a continuous chain 32 runs over the sprockets 30a and 30b to communicate or transmit the manually effected rotation of the screw shaft 22a to the shaft 22b.

The apparatus 10, embodying the present invention, may be positioned to receive articles, such as boxes, cartons and the like, from a machine or device (not shown) which performs some preceding operation upon the articles, such as, a setting up, filling, or closing of the cartons. The articles are fed to the apparatus 10 at the front end of the latter, which is at the right as viewed in Fig. 1, and the articles are there disposed in a row upon supporting members 34a and 34b which respectively extend along the confronting longitudinal edges of the plate 20 and the side frame member 14. That is, the upper surfaces of the supporting members 34a and 34b engage and support the lower surfaces of the successive articles fed to the apparatus 10 at locations adjacent the opposite sides of the successive articles. Suitably shaped inlet guide members 36a and 36b are mounted upon the plate 20 and frame member 14, respectively, adjacent the front ends of the supporting members 34a and 34b to restrict lateral movement of the successive articles fed to the apparatus. It is apparent that the lateral adjustment, described above, of the plate 20 relative to the side frame member 14 serves to accommodate the apparatus for the reception of articles having different widths between the inlet guiding members 36a and 36b.

Figures 4, 6:
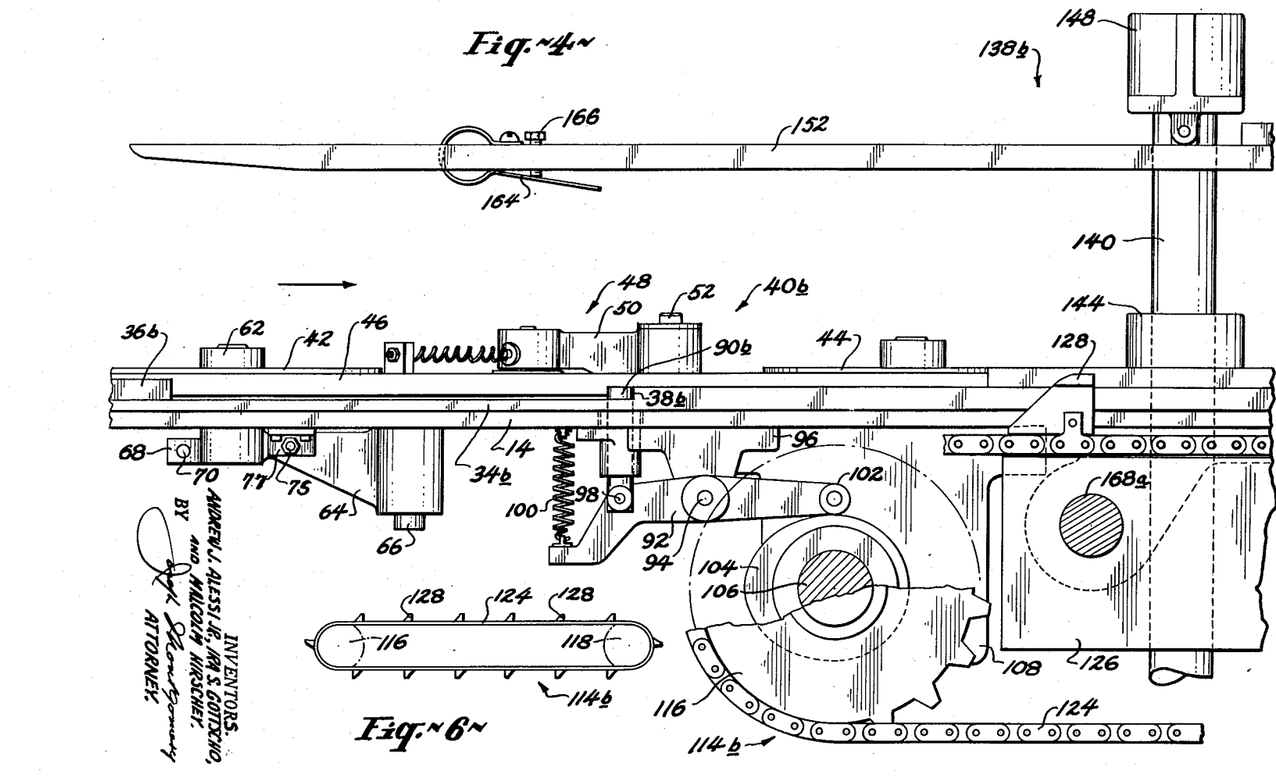
Fig. 4 is a fragmentary side elevational view of a portion of the apparatus of Fig. 1, but on an enlarged scale.
Fig. 6 is a side elevational view, on a reduced scale, of a conveyor chain assembly included in the apparatus of Fig. 1.

As seen in Fig. 4, the top surface of each of the supporting members 34a and 34b is stepped to provide an upstanding, forwardly facing shoulder 38a or 38b extending laterally across the related supporting member, with the upstanding shoulder serving to divide the top surface of each of the supporting members into a relatively low portion, extending from the inlet end of the apparatus to the shoulder, and a relatively high portion extending from the shoulder to the outlet or discharge end of the apparatus. Belt conveyor assemblies, generally identified by the reference numerals 40a and 40b, are respectively mounted upon the plate 20 and the side frame member 14 for the purpose of frictionally engaging the opposite side surfaces of the successive articles fed onto the apparatus between the guiding members 36a and 36b thereby to advance the successive articles along the supporting members 34a and 34b to and past the related shoulders 38a and 38b. The belt conveyor assemblies 40a and 40b are substantially the same in construction, with certain exceptions hereinafter referred to in detail, so that only the belt conveyor assembly 40b will be specifically described herein. The belt conveyor assembly 40b (Figs. 1, 2 and 4) includes a front pulley 42 and a rear pulley 44 which are mounted above the side frame member 14 for rotation about vertical axes spaced apart in the direction of movement of the article through the apparatus. A flexible belt 46 is trained around the pulleys 42 and 44, and the latter are disposed so that one run 46a of each of the belts 46 will extend along the outside of the related supporting member 34b to engage the adjacent side surface of an article sliding upon the top surface of the supporting members 34a and 34b.

Tensioning means, generally identified by the reference numeral 48, is associated with each of the flexible belts 46 to maintain the latter in a taut condition on the pulleys 42 and 44. As shown in the drawings, the tensioning means 48 preferably includes an arm 50 pivoted at one end, as at 52, and having a roller 54 rotatably mounted at the other end thereof for rolling contact with the outer run 46b of the related flexible belt 46. A tension spring 56 is connected at one end to the outer end of the arm 50 and at its other end to an adjustable screw 58 carried by an anchoring bracket 60 so that the spring 56 yieldably urges the arm 50 to swing in the direction bringing the roller 54 into contact with the flexible belt. Further, in accordance with the present invention, the front pulley 42 of the belt conveyor assembly 40b is rotatably mounted upon an axle or shaft 62 which is movable, in a generally lateral direction, toward and away from the path of travel of the successive articles. In this connection, the shaft 62 extends upwardly from the free end of an arm 64 which is disposed beneath the side frame member 14 and pivotally supported from the latter at its other end, as at 66. A lug 68 extends from the free end of the arm 64 and carries an adjustable screw 70 which is secured to one end of a tension spring 72 having its other end anchored to a fixed portion of the frame, as at 74. Thus, the arm 64 is yieldably urged in the direction displacing the pulley 42 toward the path of travel of the successive articles. In order to limit the spring urged movement of the pulley 42, an adjustable stop screw 75 extends through a fixed bracket 77 on the underside of the frame member 14 and is interposed in the path of travel of the arm 64. Thus, by adjusting the screw 75, the position of the front portion of the belt run 46a in relation to the guiding member 36b can be varied. With the mounting arrangement for the pulley 42 of the belt conveyor assembly 40b described above, any article fed to the apparatus 10 and having a lateral dimension which exceeds the average lateral dimension of the articles being fed will cause the pulley 42 to move laterally away from the path of travel, against the action of the spring 72, to permit such an oversize article to pass through the apparatus.

Figures 2, 3:
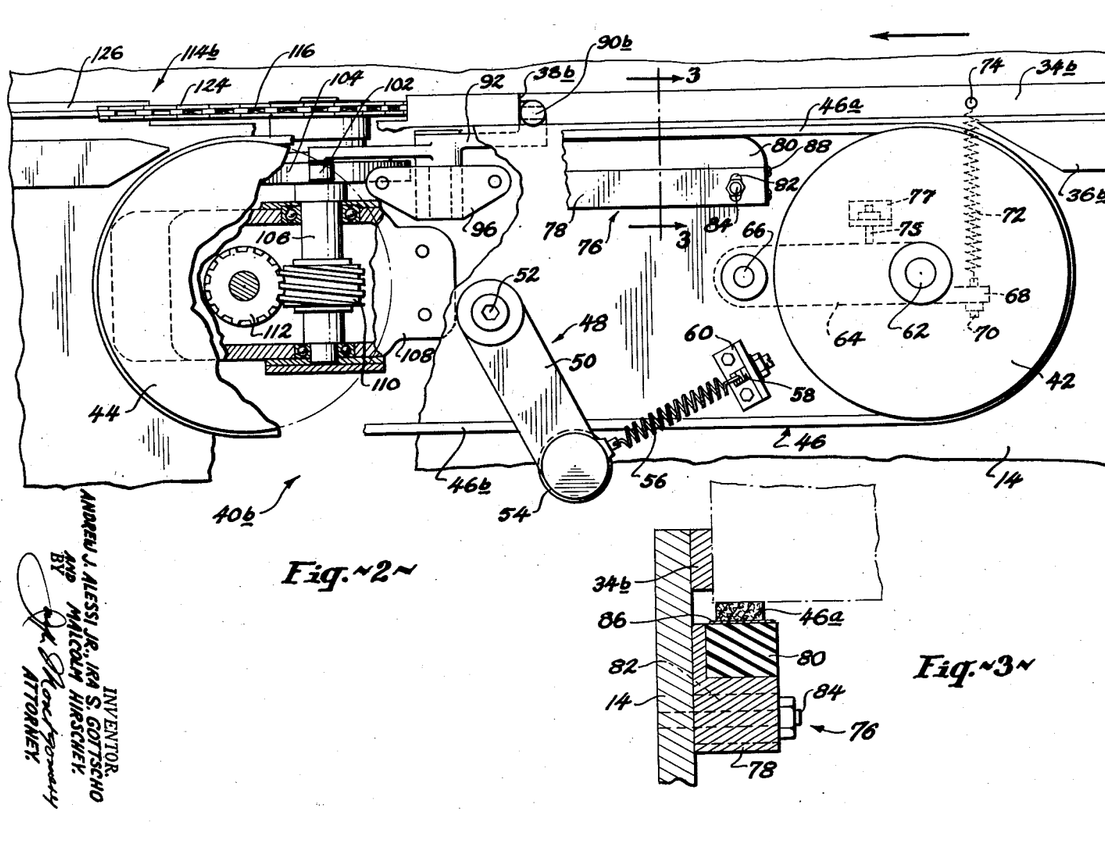
Fig. 2 is a fragmentary top plan view of a portion of the apparatus of Fig. 1, but on an enlarged scale and partly broken away and in section.
Fig. 3 is a transverse sectional view taken along the line 3—3 of Fig. 2 and on a further enlarged scale.

In order to ensure that the inner runs of the belts 46 will exert the necessary frictional force upon the adjacent side surfaces of the successive articles, a pressure applying assembly, generally identified by the reference numeral 76, is operatively associated with the inner run of the belt 46 of each of the belt conveyor assemblies. The pressure applying assembly 76, illustrated in detail in Figs. 2 and 3, includes a metal elongated block 78 having a notched longitudinal corner for accommodating a soft and resilient rubber pad 80 which is adhesively or otherwise secured to the metal block. The metal block 78 is mounted adjacent to the inner run 46a of the related flexible belt for movement laterally toward and away from the belt. Such lateral adjustment of the metal block 78 is preferably provided for by forming laterally elongated openings 82 therein to receive securing bolts 84. Each of the pressure applying assemblies 76 is completed by a thin resilient strip 86 formed of a material having a low frictional coefficient, such as, spring metal, which extends along the side of the rubber pad 80 facing toward the belt run 46a and secured at its forward end to the metal block 78, as at 88 (Fig. 2). Thus, the resilient strip 86 serves to reduce the frictional resistance imposed by the pressure applying assembly 76 upon the movement of the related flexible belt. In any event, the pressure applying assemblies 76 exert laterally inwardly directed pressure against the associated flexible belts to ensure that the successive articles will be firmly gripped, at their side surfaces, by the flexible belts while passing through that portion of the apparatus at which the pressure applying assemblies are disposed.

Although only the pulleys 42 of the belt assemblies 40a and 40b are mounted for lateral movement away from the path of the articles in response to the passage of an oversize article, the crushing of such oversize articles by the pulleys 44 can be prevented by adjusting the plate 20 relative to the frame member 14 so that the lateral distance between the inner runs of the belts 46 of the assemblies 40a and 40b, where such inner runs are tangent to the related pulleys 44, is as great as the lateral dimension of the oversize articles that may be encountered, while the pressure applying assemblies 76 and the adjustable mountings for the pulleys 42 are set so that the lateral distance between the portions of the inner runs of belts 46 passing along the pressure applying assemblies 76 and tangent to the pulleys 42 is at least as small as the lateral dimension of the smallest article to be encountered. Thus, as articles are conveyed by the belts 46, the rubber pads 80 and resilient strips 86 of the pressure applying assemblies 76 and the movable mountings for the pulleys 42 yield, as required, to permit the passage of articles having lateral dimensions greater than the minimum lateral dimension for which the pressure applying assemblies 76 and the mountings for pulleys 42 are set.

The above described structure of the apparatus 10 embodying the present invention is effective to cause movement of the successive articles along the relative low portions of the top surfaces of the supporting members 34a and 34b until the forward end of each of the successive articles comes into contact with the shoulders 38a and 38b. Such contact serves to arrest the forward movement or advancement of the articles thereby causing the flexible conveyor belts 46 to slip relative to the engaged side surfaces of the articles. In order to effect longitudinal separation of the successive articles and to permit continued movement of the separated articles through the apparatus, lift plungers 90a and 90b extend vertically through the supporting members 34a and 34b, respectively, at locations immediately in front of the respective shoulders 38a and 38b. The lift plungers 90a and 90b are intermittently reciprocated in vertical directions between retracted positions, in which their top ends are flush with the lower top surface portion of the related supporting member, and operative positions in which the lift plungers are elevated to bring their top ends up to the level of the relatively high top surface portions of the related supporting members 34a and 34b. The reciprocation of the lift plungers 90a and 90b is controlled so that during the movement of an article to its position of rest in contact with the shoulders 38a and 38b the lift plungers are in their retracted positions, and thereafter the plungers are raised to lift the forward end of the arrested article and thereby to permit the belts 46 of the belt conveyor assemblies 40a and 40b to again cause advancement of the article onto the raised or high top surface portions of the supporting members 34a and 34b. Immediately after an article has been raised onto the relatively high surface portions of the supporting members, the plungers 90a and 90b are again retracted so that the article next in line will come into contact with the shoulders 38a and 38b and thereby have its advancement interrupted, while the preceding article continues to advance and thereby to effect separation of the successive articles. The mechanism for effecting vertical reciprocation of each of the lift plungers 90a and 90b is shown in detail in Figs. 2 and 4 and includes a lever 92 rockably mounted intermediate its opposite ends, as at 94, upon a suitable bracket 96 mounted below either the side frame member 14 or the plate 20, as the case may be. One arm of the lever 92 is pivotally connected, as at 98, to the lower end of the related one of the lift plungers, and the same arm, at its free end, is connected to a tension spring 100 which urges the lever 92 to rock in the direction elevating the related lift plunger. The opposite end of the lever 92 carries a rotatable cam follower roller 102 which rides upon the periphery of a rotated radial cam 104. The radial cam 104 is fixed upon a shaft 106 which is rotatably journalled in a suitable housing 108 mounted upon the underside of the side frame member 14 or the plate 20, as the case may be. Thus, as the shaft 106 is rotated, in a manner hereinafter described in detail, engagement of the radial high point or points of the cam 104 with the cam follower 102 will cause the lever 92 to rock in the direction retracting the related lift plunger 90a or 90b, while the tension spring 100 will cause the roller 102 to follow the periphery of the cam 104 and will cause elevation of the lift plunger when the radially small portions of the cam are in contact with the cam follower.

As seen in Fig. 2, each of the pulleys 44 of the belt conveyor assemblies is rotatably driven from the cam carrying shaft 106. Such connection between the shaft 106 and the shaft carrying the related rear pulley 44 may be provided by a worm 110 fixed upon the shaft 106 and meshing, within the housing 108, with a worm gear 112 fixed upon the shaft carrying the pulley 44. Thus, the movements of the lift plungers 90a and 90b will be synchronized with the movements of the belt conveyors.

After the successive articles have been lifted over the shoulders 38a and 38b, and thereby separated in the manner described above, the separated articles are further advanced through the apparatus to the discharge end of the latter, by chain conveyor assemblies, generally identified by the reference numerals 114a and 114b, which are disposed in vertical planes adjacent to the inside edges of the supporting members 34a and 34b respectively. The chain conveyor assemblies 114a and 114b are the same, and each of these assemblies includes a front sprocket 116 secured to the inner end of the cam shaft 106 at the related side of the machine or apparatus for rotation about a laterally extending horizontal axis, and a rear sprocket 118 which is keyed upon a laterally extending, horizontal driving shaft 120 which is disposed below the frame members 12 and 14 and the plate 20 adjacent the rear or discharge end of the apparatus. The opposite ends of the driving shaft 120 are rotatably journalled in suitable bearing brackets or hangers 122a and 122b which are respectively secured or mounted to the under surface of the frame members 12 and 14. While the rear sprockets 118 of both chain conveyor assemblies are rotatable with the driving shaft 120, it will be noted that the rear sprocket of the chain conveyor assembly 114a is movable axially along the shaft 120 in response to lateral adjustments of the plate 20. Each of the chain conveyor assemblies further includes a continuous chain 124 running over the sprockets 116 and 118. Thus, the rotation of the driving shaft 120, which may be rotated by a suitable motor or the like (not shown), is transmitted, by way of the chains 124 and the sprockets 116 and 118, to the cam shafts 106, thereby ensuring that the operation of the lift plungers 90a and 90b and of the belt conveyor assemblies 40a and 40b will be synchronized with each other and with the operation of the chain conveyor assemblies. A chain guide 126 (Figs. 4 and 5) extends between the front and rear sprockets of each of the chain conveyor assemblies and is positioned to support the upper run of the related chain 124 along its upper edge. Further, a series of spaced apart pusher members 128 (Figs. 4, 5 and 6) extend from the chain 124 and are dimensioned to project above the upper surface of the adjacent supporting member 34a or 34b during movement along the upper run of the chain. The speed of movement of each of the chains 124 is so synchronized in relation to the vertical reciprocation of the lift plungers 90a and 90b and to the speed of movement of the conveyor belt assemblies 40a and 40b that a pusher 128 will come up behind each of the successive articles as the latter are about to be disengaged from the belt conveyor assemblies. Preferably, as shown in Fig. 6, each of the chains 124 has an even number of equally spaced apart pushers 128 extending therefrom so that, by the addition of a pusher on the chain 124 between the successive existing pushers, or by the removal of alternate pushers from the chain, and by corresponding alteration of the number of radially enlarged points upon the related cam 104, the rate of discharge of articles from the apparatus may be varied substantially without changing the speed of movement of the several conveyor assemblies. In order to guide the successive articles during the movement of the latter under the influence of the conveyor chain assemblies, guide members 30a and 30b are mounted upon the confronting edge portions of the plate 20 and the side frame member 14, respectively, and extend substantially from the rear pulleys 44 of the belt conveyor assemblies 40a and 40b to the rear or discharge end of the apparatus 10 (Fig. 1). Adjacent the path of travel of the articles under the influence of the conveyor chain assemblies, an operating station is disposed, at which station markings and the like may be applied to the side surfaces of the successive articles. In the embodiment of the invention illustrated in the drawings, a marking device is generally identified by the reference numeral 132 and is mounted upon the side frame member 14. The marking device 132 may be of the kind disclosed in United States Letters Patent No. 2,655,103, issued October 13, 1953, to Malcolm Hirschey, assigned to Adolph Gottscho, Inc., and includes a rotated marking wheel 134 which is rotatable about a vertical axis and preferably has a relatively small diameter, for example, a diameter which provides a circumference equal to one-half the distance between the successive pushers 128 on the chain 124. Such a small diameter marking wheel ensures the clarity of the marked impression, even when the sides of the articles to be marked are relatively flexible or resilient, as the small diameter provides a limited area of contact of the marking wheel with the side surface of the article. In order to ensure rotation of the marking wheel 134 at a peripheral speed equal to the linear speed of the successive articles propelled by the conveyor chain assemblies, the marking device 132 is preferably actuated by a sprocket and chain transmission 136 (Fig. 1) driven from the rotated shaft 120.

Figure 5:
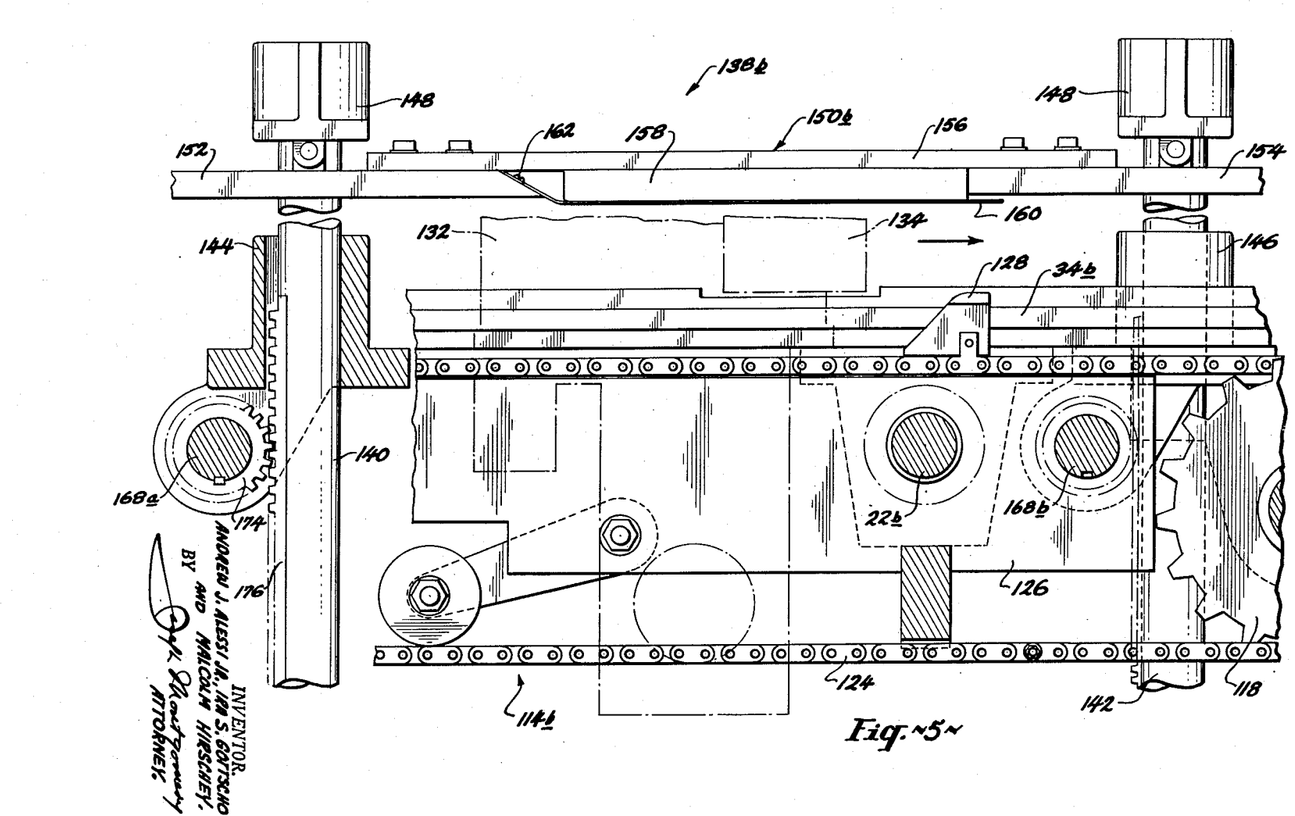
Fig. 5 is a side elevational view, partly broken away and in section, of another portion of the apparatus of Fig. 1, but on an enlarged scale.

The apparatus 10 further includes hold down assemblies 138a and 138b for engagement with the top surfaces of the articles as they are conveyed through the apparatus. Each of the hold down assemblies 138a and 138b includes two vertically movable posts 140 and 142 which extend through suitable fittings 144 and 146, respectively, mounted upon the top surface of either the plate 20 or the side frame member 14. At its upper end, each of the posts 140 and 142 has an inwardly directed arm 148 secured thereto, and the free ends of the arms 148 of the hold down assemblies 138a and 138b respectively support rail assemblies 150a and 150b. Each of the rail assemblies 150a and 150b includes a forward portion 152, a rear portion 154 and an intermediate portion 156 spanning a gap between the adjacent ends of the portions 152 and 154 (Fig. 5). The above mentioned gap between the adjacent ends of the rail portions 152 and 154 is disposed substantially at the marking station, and a rubber, or other soft resilient, pad 158 is secured to the lower surface of the intermediate portion 156 in that gap. A resilient strip 160 formed of metal, or some other material having a low coefficient of friction, is secured at its leading end, as at 162, to the trailing end of the front rail portion 152, and extends below the undersurface of the rubber pad 158. As seen in Fig. 5, the pad 158 and strip 160 extend slightly below the lower surfaces of the preceding and following rail portions 152 and 154 to bear with increasing pressure upon the top surface of an article during the actual marking operation.

Each of the hold down rail assemblies 150a and 150b further includes a leaf spring member 164 secured to the front portion 152 of the rail assembly (Fig. 4) and having a leg disposed under the portion 152 at a location for engagement with the top surface of an article during the lifting of that article at its front end by the lift plungers 90a and 90b. An adjustment screw 166 extends through the rail portion 152 and is engageable with the lower leg of the spring member 164 to vary the distance that the latter extends below the lower surface of the rail portion. In resiliently holding down the rear end portion of an article during lifting of the front end portion of the latter over the shoulders 38a and 38b, the spring member 164 ensures that the following articles will not be lifted with the article at rest against the shoulders 38a and 38b and thereby prevents the advancement of several articles at one time over the above mentioned shoulders.

In order to adapt the apparatus 10 for the conveying of articles having different heights, the hold down assemblies 138a and 138b include mechanisms for simultaneously varying the distance between the hold down rail assemblies 150a and 150b and the surfaces of the supporting members 34a and 34b over which the articles are advanced. Such adjusting mechanism includes laterally extending horizontal shafts 168a and 168b which are respectively journalled in depending portions of the housings 144 and 146 through which the posts 140 and 142 are vertically slidable. The shaft 168a, extends at one end beyond the side frame member 14 and has a hand wheel 170 secured thereon to provide for the manual rotation of that shaft. A suitable chain and sprocket transmission 172 is provided between the shafts 168a and 168b to transmit the rotation of the former to the latter. Keyed on the shafts 168a and 168b within the housings 144 and 146, respectively, are spur gears 174 (Fig. 5) which mesh with related gear racks 176 secured to the posts 140 and 142. Thus, when the hand wheel 170 is rotated, the posts 140 and 142 are simultaneously raised or lowered to vary the vertical distance between the hold down rail assemblies 150a and 150b and the surfaces over which the articles are conveyed.

With apparatus embodying the present invention, and constructed in the manner described above, cartons which are skewed upon being fed to the inlet end of the apparatus are either straightened out upon contact with the shoulders 38a and 38b adjacent their opposite sides, or at the time when the pushers 128 take over the task of propelling the carton through the apparatus. However, in no case does the skewed condition of the article upon receipt at the inlet end of the apparatus interfere with the proper feeding of the article through the apparatus and past the marking station. Further, when the apparatus 10 is arranged to receive cartons from a cartoning machine, and a carton is received with some of its side flaps improperly tucked, the conveyor belts 46, in engaging the opposite side surfaces of the article will apply pressure to the flaps to complete the tucking thereof. In any event, an improperly tucked carton, having a greater lateral dimension than a normal carton, will merely produce an increased contact pressure between the belts 46 and the side surfaces of the carton and the moving belts will still continue to feed the carton through the apparatus. Further, since the belts 46, which engage the side surfaces of the article or carton, are movable members, the deposit of glue or adhesive thereon will in no way deter or resist the movement of the successive cartons through the apparatus. It should also be noted that the supporting members 34a and 34b, in providing continuous support surfaces for the articles during their advancement through the apparatus 10, will prevent the rotation of relatively long and narrow cartons or articles in the manner referred to above in connection with the prior machines of this character. Finally, in connection with the hold down assemblies 138a and 138b, it should be noted that the hold down rail assemblies are rigidly supported and simultaneously adjustable, with the resiliency being provided only at those locations where required so that the passage of an article of unusual height will not in any way distort or displace the hold down assemblies as a whole. It will also be appreciated that the movements of the belt conveyor assemblies and the chain conveyor assembly in the apparatus 10 are in planes which are normal to each other so that the effective lengths of contact of such conveyor assemblies with the articles may overlap substantially thereby permitting the operation of the apparatus at a high speed.

While a specific embodiment of the present invention has been described in detail herein and illustrated in the accompanying drawings, merely by way of example, it is to be understood that the present invention is not limited to that specific embodiment and that various changes and modifications obvious to one skilled in the art, may be embodied therein without departing from the scope or spirit of the invention as defined in the appended claims.

What is claimed is:

1. Article conveying apparatus of the described character comprising vertically fixed, stepped conveying surface defining means having an initial relatively low level portion and a following relatively high level portion separated by an upstanding lateral shoulder; belt conveyor means at the opposite sides of said conveying surface and having horizontally moving upstanding belt runs extending along said initial portion, past said upstanding lateral shoulder and along at least a part of said following portion extending from said shoulder for frictionally engaging the side surfaces of successive articles fed to the apparatus at said initial portion; lift means operative intermittently to raise each of the successive articles over said shoulder for continued movement onto said following portion under the influence of said belt conveyor means; chain conveyor means having spaced apart pushers thereon which move along and extend above said following portion of the conveying surface for engagement behind each of the successive articles moved onto said following portion thereby to propel the successive articles along said following portion in spaced apart relationship and past an operating station disposed adjacent said following portion; and hold down means disposed above said conveying surface defining means for limiting the vertical movement of successive articles during travel of the latter along said conveying surface defining means, and including vertically resilient means extending along at least the portion of said hold down means in proximity to said operating station to impose an increased and yieldable downward pressure on each of the successive articles during movement of the latter past said operating station.

2. Article conveying apparatus of the described character according to claim 1; wherein each of said belt conveyor means includes laterally resilient means backing up said upstanding belt runs to apply yieldable pressure against the latter in the direction toward the path of travel of the successive articles on said conveying surface defining means and thereby to ensure adequate contact pressure between said upstanding belt runs and the side surfaces of the successive articles.

3. Article conveying apparatus of the described character according to claim 1; further comprising a frame assembly including opposite side frame members, cross-members between the ends of said side frame members and an elongated plate carried by said cross-members parallel to said side frame members and movable laterally toward and away from one of said side frame members, and means for displacing said elongated plate laterally toward and away from said one side frame member; and wherein said stepped conveying surface defining means includes two elongated supporting members mounted on the confronting edges of said one side frame member and said plate, respectively, and each having a stepped top surface forming said conveying surface so that lateral displacement of said elongated plate serves to adapt the apparatus for handling articles of different widths.

4. Article conveying apparatus of the described character comprising a frame assembly including opposite side frame members, cross-members between the ends of said side frame members, an elongated plate carried by said cross-members parallel to said side frame members and movable laterally toward and away from one of said side frame members, and means for displacing said elongated plate laterally toward and away from said one side frame member; two elongated supporting members mounted on the confronting edges of said one side frame member and said plate, respectively, and each having a stepped top surface defining a vertically fixed, stepped conveying surface including an initial relatively low portion and a following relatively high portion separated by an upstanding lateral shoulder; and so that lateral adjustment of said elongated plate serves to adapt the apparatus for handling articles of different widths; belt conveyor means at the opposite sides of said conveying surface and having horizontally moving upstanding belt runs extending along said initial portion, past said upstanding lateral shoulder and along at least a part of said following portion extending from said shoulder for frictionally engaging the side surfaces of successive articles fed to the apparatus at said initial portion, one of said belt conveyor means being mounted on said elongated plate and the other of said belt conveyor means being mounted on said one side frame member, and each of said belt conveyor means including two pulleys lying in the same horizontal plane at a level slightly above the top surface of the adjacent one of said supporting members and a flexible belt trained around said pulleys, said pulleys being laterally disposed so that one straight run of the related flexible belt extends substantially parallel to said adjacent supporting member and bounds the outer longitudinal edge of the top surface of the latter; and the forward pulley of at least one of said belt conveyor means being laterally movable and said one belt conveyor means further including spring means yieldably resisting lateral movement of said forward pulley in the direction away from said adjacent supporting member so that the lateral distance between the flexible belts at the forward pulleys is capable of expansion to accommodate an article of excessive width therebetween; lift means operative intermittently to raise each of the successive articles over said shoulder for continued movement onto said following portion under the influence of said belt conveyor means; and chain conveyor means having spaced apart pushers thereon which move along and extend above said following portion of the conveying surface for engagement behind each of the successive articles moved onto said following portion thereby to propel the successive articles along the latter in spaced apart relationship and past an operating station disposed adjacent said following portion.

5. Article conveying apparatus of the described character according to claim 4; wherein each of said belt conveyor means further includes laterally resilient means backing-up said one straight run of the related flexible belt to apply yieldable lateral pressure against the latter in the direction toward the path of travel of the successive articles on said top surfaces of the supporting members and thereby to ensure adequate contact pressure between said one run of each flexible belt and the adjacent side surfaces of the successive articles.

6. Article conveying apparatus of the described character according to claim 5; wherein each of said resilient backing-up means includes a rigid support block extending parallel to said one straight run of the related belt at the outer side of said one run, a rubber pad on said support block facing toward said one run of the belt, and a thin flexible strip of a material having a relatively low coefficient of friction secured at one end to said support block and extending along said rubber pad interposed between the latter and said one straight run of the belt so that said resilient backing-up means only slightly resists the movement of the related belt.

7. Article conveying apparatus of the described character according to claim 1; further comprising frame means carrying said conveying surface defining means and including two parallel and longitudinally elongated, horizontal plates, and means supporting said plates for lateral movement of at least one of said plates toward and away from the other of said plates; and wherein said conveying surface defining means includes elongated article supporting members having stepped top surfaces and extending along and mounted on the confronting inner edges of said plates.

8. Article conveying apparatus of the described character according to claim 7; wherein one of said belt conveyor means is mounted on each of said plates and each of said belt conveyor means includes front and rear pulleys rotatable about vertical axes above the related one of said plates, and a continuous flexible belt trained around said front and rear pulleys, said front and rear pulleys of each belt conveyor means being disposed so that one straight run of the related belt extends along and bounds the outer edge of the article supporting member on the related one of said plates.

9. Article conveying apparatus of the described character according to claim 8; wherein said chain conveyor means includes front and rear sprockets mounted for rotation about parallel, horizontal axes and in the same vertical plane adjacent the inner edge of each of said article supporting members, the axes of said front sprockets being disposed substantially in front of the axes of said rear pulleys of said belt conveyor means, a continuous chain passing around each of said front sprockets and the related one of said rear sprockets, said sprockets being disposed vertically in relation to said article supporting members so that the upper straight runs of said chains are horizontal and below the top surfaces of the related article supporting members, said pushers extending from each of said chains a distance greater than the distance said upper runs are below said top surfaces of the article supporting members.

10. Article conveying apparatus of the described character according to claim 9; further comprising means transmitting the movements of said chain conveyor means to said belt conveyor means at the related sides of the apparatus.

11. Article conveying apparatus of the described character according to claim 10; further comprising means driven by said chain conveyor means and actuating said intermittently operative lift means so that said belt conveyor means, lift means and chain conveyor means operate in synchronism to longitudinally separate the successive articles at said shoulders of the stepped conveying surface and then to advance the separated articles in predetermined spaced apart relationship.

12. Article conveying apparatus of the described character according to claim 11; wherein said lift means includes a vertically reciprocatable lift plunger extending through each of said article supporting members immediately in advance of the shoulder defining step in the top surface of the latter; and wherein said means driven by said chain conveyor means and actuating said lift means includes a cam rotatable with the forward sprocket at the related side of the apparatus, an actuating lever rockably mounted intermediate its ends below the related article supporting member, cam follower means on one end of said actuating lever engageable with the surface of said cam, and means connecting the other end of said actuating lever to the lower end of the lift plunger passing through said related article supporting member.

13. Article conveying apparatus of the described character according to claim 12; wherein said means actuating said lift means includes a spring member connected to said actuating lever and yieldably urging the latter in the direction for raising the upper end of the related lift plunger above the level of the top surface of said related article supporting member following the step, said cam having at least one radially enlarged portion operative to swing said lever in the direction depressing the top end of said lift plunger below the level of said top surface in advance of said step.

14. Article conveying apparatus of the described character comprising frame means including two parallel and longitudinally elongated, horizontal plates, and means supporting said plates for lateral movement of at least one of said plates toward and away from the other of said plates; elongated article supporting members having stepped top surfaces and extending along and mounted on the confronting inner edges of said plates to define a vertically fixed, stepped conveying surface having an initial relatively low level portion and a following relatively high level portion separated by an upstanding lateral shoulder; belt conveyor means at the opposite sides of said conveying surface and having horizontally moving upstanding belt runs extending along said initial portion, past said upstanding lateral shoulder and along at least a part of said following portion extending from said shoulder for frictionally engaging the side surfaces of successive articles fed to the apparatus at said initial portion; lift means operative intermittently to raise each of the successive articles over said shoulder for continued movement onto said following portion under the influence of said belt conveyor means; chain conveyor means having spaced apart pushers thereon which move along and extend above said following portion of the conveying surface for engagement behind each of the successive articles moved onto said following portion thereby to propel the successive articles along the latter in spaced apart relationship and past an operating station disposed adjacent said following portion; and hold down means including upstanding posts mounted on each of said plates for vertical movement relative to the latter, two hold-down rail assemblies, suspension means on the upper ends of said posts mounted on each of said plates and supporting a related one of said rail assemblies in a position extending along and overlying the path of travel of successive articles on said article supporting members, and means operative to simultaneously displace all of said upstanding posts in the vertical direction for accommodating articles of different heights therebeneath.

15. Article conveying apparatus of the described character according to claim 14; wherein said means operative to displace said posts includes horizontal, rotatable shafts extending laterally adjacent said posts, meshing gear racks and spur gears on said posts and shafts, respectively, to translate rotation of the latter into vertical movements of said posts, and chain and sprocket means interconnecting said shafts so that the latter rotate simultaneously.

16. Article conveying apparatus of the described character according to claim 14; wherein each of said rail assemblies includes elongated and spaced apart aligned front and rear rail portions, an intermediate rail portion spanning the gap between the confronting ends of the spaced apart front and rear portions, a rubber pad on the underside of said intermediate rail portion in said gap and normally extending below the lower surfaces of said front and rear rail portions, and a resilient strip having a low coefficient of friction secured to said front rail portion and extending along the lower surface of said rubber pad so that said pad will exert an increased downward pressure on the successive articles as the latter pass thereunder and said strip will ensure that the resistance to longitudinal movement of the articles resulting from said downward pressure remains relatively small.

17. Article conveying apparatus of the described character according to claim 1; wherein said chain conveyor means includes an even number of equally spaced apart pushers so that pushers can be added or removed between successive pushers to vary the rate at which articles are discharged from the apparatus without varying the speed of the conveyor movements.

References Cited in the file of this patent

UNITED STATES PATENTS

| Number | Name | Date |
|---|---|---|
| 779,908 | Whitaker | Jan. 10, 1905 |
| 1,097,012 | Eldredge | May 19, 1914 |
| 1,134,221 | Nillson | Apr. 6, 1915 |
| 1,172,447 | Forte | Feb. 22, 1916 |
| 1,627,363 | Webster | May 3, 1927 |
| 2,370,325 | Ranney | Feb. 27, 1945 |
| 2,371,926 | Schmitt | Mar. 20, 1945 |
| 2,372,646 | Barnby | Apr. 3, 1945 |
| 2,403,673 | Mead | July 9, 1946 |
| 2,471,098 | Davies | May 24, 1949 |
| 2,602,393 | Hirschey | July 8, 1952 |
| 2,604,039 | Gottscho | July 22, 1952 |
| 2,670,835 | Huttmann | Mar. 2, 1954 |
| 2,675,119 | Birch | Apr. 13, 1954 |
| 2,679,313 | Gueffroy et al. | May 25, 1954 |
| 2,679,919 | Koning | June 1, 1954 |